(12) United States Patent
Sato

(10) Patent No.: US 6,292,940 B1
(45) Date of Patent: Sep. 18, 2001

(54) PROGRAM COMPLETE SYSTEM AND ITS COMPILE METHOD FOR EFFICIENTLY COMPILING A SOURCE PROGRAM INCLUDING AN INDIRECT CALL FOR A PROCEDURE

(75) Inventor: Saori Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/236,639

(22) Filed: Jan. 26, 1999

(30) Foreign Application Priority Data

Jan. 26, 1998 (JP) .................................................. 10-012581

(51) Int. Cl.$^7$ ...................................................... G06F 9/65
(52) U.S. Cl. .................... 717/9; 717/4; 717/7; 717/8; 717/10
(58) Field of Search ................................... 717/9, 7, 8, 4, 717/10

(56) References Cited

U.S. PATENT DOCUMENTS

| | | | |
|---|---|---|---|
| 5,280,613 | * | 1/1994 | Chan et al. ............................. 717/7 |
| 5,469,572 | * | 11/1995 | Taylor .................................... 717/10 |
| 5,615,400 | * | 3/1997 | Cowsar et al. ...................... 709/305 |
| 5,815,720 | | 9/1998 | Buzbee ................................. 395/709 |
| 5,857,105 | * | 1/1999 | Ayers et al. ............................ 717/8 |
| 5,999,737 | * | 12/1999 | Srivastava .............................. 717/9 |
| 6,026,234 | * | 2/2000 | Hanson et al. .......................... 717/4 |
| 6,041,179 | * | 3/2000 | Bacon et al. ............................ 717/9 |
| 6,182,283 | * | 1/2001 | Thomson ................................ 717/9 |
| 6,189,144 | * | 2/2001 | Weber .................................... 717/10 |

FOREIGN PATENT DOCUMENTS

| | | |
|---|---|---|
| 1-118931 | 5/1989 | (JP) . |
| 4-273533 | 9/1992 | (JP) . |
| 9-319587 | 12/1997 | (JP) . |
| 9-330233 | 12/1997 | (JP) . |

OTHER PUBLICATIONS

Title: Simple and Effective Link–Time Optimization of Modula—3 Programs, author: Fernandez, ACM, 1995.*
Title: Reducing Indirect Function Call Overhead In C++ Programs, author: Calder et al, ACM 1994.*
Chang, P. et al., "Profile–guided Automatic Inline Expansion for C Programs", *Software—Practice and Experience,* vol. 22, No. 5, May 1992, pp. 349–369.
Hwu, W. et al., "Achieving High Instruction Cache Performance with an Optimizing Complier", Proceedings of the 16$^{th}$ Annual International Symposium on Computer Architecture, 1989, pp. 242–251.
Chang et al.; "Using Profile Information to Assist Classic Code Optimizations"; Software Practice and Experience; vol. 21, No. 12; Dec. 1991; pp. 1–33.

* cited by examiner

*Primary Examiner*—Mark R. Powell
*Assistant Examiner*—Chameli Chaudhuridas
(74) *Attorney, Agent, or Firm*—Foley & Lardner

(57) ABSTRACT

A program compile system comprising a compiler for compiling a source program to an object program and a program executing unit for executing the generated object program based on a predetermined input pattern and collecting information on a procedure, function, or subroutine, the system characterized in that optimization of the object program is performed by the compiler changing an indirect call code to a direct call code, based on the information collected by the program executing unit.

15 Claims, 14 Drawing Sheets

```
1:      f()
2:      {
3:          t = 0;
4:          p = 10;
5:          printf("%d", fp);
6:          (*fp)();
7:
8:          s = t * 2;
9:          q = p + 1;
10:     }
```

```
1:      f()
2:      {
3:          t=0;
4:          p=10;
5:
6:          if(fp==g){
7:              g();
8:          }
9:          else{
10:             (*fp)();
11:         }
12:
13:         s=t*2;
14:         q=p+1;
15:     }
```

```
1:      f()
2:      {
3:          t = 0;
4:          p = 1 0;
5:
6:          if(fp==g){
7:              s = (t+p)*3;
8:          }
9:          else{
10:             (*fp) ();
11:         }
12:
13:         s = t*2;
14:         q = p+1;
15:     }
```

FIG. 10

```
1:      f()
2:      {
3:          t = 0;
4:          p = 10;
5:
6:          if(fp==g){
7:              s = (0 + 10) * 3;
8:              s = t * 2;
9:              q = p + 1;
10:         }
11:         else{
12:             (*fp) ();
13:             s = t * 2;
14:             q = p + 1;
15:         }
16:
17:     }
```

FIG. 11

```
1:      f()
2:      {
3:          t = 0;
4:          p = 10;
5:
6:          if(fp==g){
7:              s = 0;
8:              q = 11;
9:          }
10:         else{
11:             (*fp)();
12:             s = t*2;
13:             q = p+1;
14:         }
15:
16:     }
```

FIG. 12

```
1:      f()
2:      {
3:          t = 0;
4:          p = 10;
5:
6:          if(fp==g){
7:              g();
8:              s = t*2;
9:              q = p+1;
10:         }
11:         else{
12:             (*fp)();
13:             s = t*2;
14:             q = p+1;
15:         }
16:
17:     }
```

FIG. 13

```
1:      f()
2:      {
3:          t = 0;
4:          p = 10;
5:
6:          if(fp==g){
7:              g();
8:              s = 0*2;
9:              q = 10+1;
10:         }
11:         else{
12:             (*fp)();
13:             s = t*2;
14:             q = p+1;
15:         }
16:
17:     }
```

FIG. 14

```
1:      f()
2:      {
3:          t=0;
4:          p=10;
5:
6:          if(fp==g){
7:              g();
8:              s=0;
9:              q=11;
10:         }
11:         else{
12:             (*fp)();
13:             s=t*2;
14:             q=p+1;
15:         }
16:
17:     }
```

```
1:      if ( expression )
2:          fp = g;
3:      }
4:      else {
5:          fp = h;
6:      }
        . . .
300:    (*fp) ();
```

PROGRAM COMPLETE SYSTEM AND ITS COMPILE METHOD FOR EFFICIENTLY COMPILING A SOURCE PROGRAM INCLUDING AN INDIRECT CALL FOR A PROCEDURE

BACKGROUNDS OF THE INVENTION

1. Field of the Invention

The present invention relates to a program compile system and its compile method for compiling a source program described in a programming language to an object program described in a processor executable language (machine language, assembly language, etc.).

2. Description of the Related Art

As the conventional program compile system, there is a system disclosed in, for example, Japanese Patent Publication Laid Open (Kokai) No. Heisei 1-118931, "Program Conversion Method". FIG. 15 is a block diagram showing the electrical structure of the conventional program compile system disclosed in the same publication.

The conventional program compile system shown in FIG. 15 comprises a first program storing unit 210, a compiler 220, a second program storing unit 230, a third program storing unit 240, an input data storing unit 250, a program executing unit 260, a fourth program storing unit 270, and an analysis result storing unit 280.

In the program compile system, the compiler 220 reads a source program from the first program storing unit 210, generates a temporary object program in which a procedure, function, subroutine (hereinafter, they are generically referred to as "procedure") have not been optimized, and stores the program into the second program storing unit 230. FIG. 16(a) shows an example of a source program described in the C language, that is one kind of programming language.

Next, the program executing unit 260 reads a program for analyzing the procedure calling frequency from the fourth program storing unit 270, and executes the program. Namely, the program executing unit 260 reads the temporary object program from the second program storing unit 230 and reads necessary input data from the input data storing unit 250. Simulating the execution of the temporary object program, the unit 260 adds up the number of times a procedure is called, in every procedure within the temporary object program. Each resultant summation is stored in the analysis result storing unit 280 together with the code amount (code size) of the corresponding procedure, as the procedure calling frequency analysis result.

Reading the analysis result of the procedure calling frequency from the analysis result storing unit 280, the compiler 220 judges whether the frequency of each procedure being called is beyond the predetermined standard and whether the size of each procedure is beyond the predetermined standard. Whether the optimization of each procedure should be performed or not by inline expansion, depends on the judgement result; if it is necessary, the optimization by the inline expansion is performed. Here, the optimization by the inline expansion means that a call code of a procedure on a source program is converted into execution code string for directly processing the procedure in an object program. Performance of the optimum inline expansion can eliminate the overhead caused by stack frame generation and register saving at the calling time of a procedure, thereby improving the running speed when a computer runs an object program.

As mentioned above, the compiler 220 generates a final object program and stores the program into the third program storing unit 240. FIG. 16(b) is an example of the final object program expressed in the C language, which the source program shown in FIG. 16(a) has been compiled to and the optimization processing by the inline expansion has been performed on.

In these days, prevailing is a programming language, which is based on such a thinking that a system is tried to be expressed by the group of an integrated object with the data group and the procedure group for using the data. This thinking is called as an object oriented one, and the programming language based on this object oriented thinking is called as an object oriented language. There is the Smalltalk as the typical object oriented language. Further, there appear many programming languages, such as C++, TURBO PASCAL, in which the object oriented thinking is added to the existing programming languages of the procedure announcement type.

In these object oriented languages, there is a tendency to increase not only use of a direct call of a procedure but also use of an indirect call thereof, for processing's sake. In order to generate such an efficient object program that can be run faster by a computer, it is necessary to perform some optimization on an indirect call. Here, a direct call means such a call that, as illustrated in FIG. 16(a), a call code for a procedure is described at a position on the source program and that the relevant procedure is directly called at the position. An indirect call means such a call that, as illustrated in FIG. 17, an address of a procedure is assigned to a specified variable (pointer: variable "fp" in the case of FIG. 17) at a position on the source program and that the relevant procedure is indirectly called by use of the variable at the other position (at the 300th line, in the case of FIG. 17).

The optimization processing by inline expansion in the above mentioned conventional program compile system, however, cannot be adopted to an indirect call procedure, but only to a direct call procedure. This is why, for example, in the source program shown in FIG. 17, when the expression is satisfied under the branch conditions shown at the first line to the sixth line, the address of the procedure "g" is assigned to the variable "fp"; while, when the expression is not satisfied, the address of the procedure "h" is assigned to the variable "fp", and at the same time, at the 300th line, a procedure is indirectly called by the variable "fp"; however, it is impossible to decide whether the procedure actually called at the 300th line is the procedure "g" or the procedure "h" when the compiler 220 compiles the source program to a temporary object program.

When these codes are described in lines closer to each other, it is possible to decide whether the procedure called by an indirect procedure call is either the procedure "g" or the procedure "h" in the static analysis with no execution of a temporary object program; however, an indirect call code for a procedure is at the 300th line, far from the address assignment code toward the variable "fp" of either the procedure "g" or "h", in FIG. 17. This is intended to show that the static analysis is impossible in the case of FIG. 17.

Therefore, the above-mentioned conventional program compile system is defective in that a source program including an indirect procedure call cannot be compiled to an efficient object program.

SUMMARY OF THE INVENTION

An object of the present invention is, in order to solve the above-mentioned problem, to provide a program compile system and its compile method capable of compiling a source program to an efficient object program, even if an object of the compile is the source program including an indirect procedure call.

According to the first aspect of the invention, a program compile system for compiling a source program described in a programming language to an object program described in a language executable by a processor, comprises compile means for compiling the source program to the object program, and information collecting means for running the object program generated by said compile means based on a predetermined input pattern and collecting information on a procedure, a function, or a subroutine, said compile means optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected by said information collecting means.

In the preferred construction, said information collecting means in every indirect call code, collects the number of times the procedure, function, or subroutine is actually called at a position of the indirect call code, while running the object program compiled by said compile means, at least, as the information on the procedure, function, or subroutine, based on a predetermined input pattern, and said compile means changes the indirect call code on the corresponding procedure, function, or subroutine into the direct call code when the number of calling times collected by said information collecting means satisfies a predetermined condition.

In another preferred construction, said information collecting means in every indirect call code, collects the number of times the procedure, function, or subroutine is actually called at a position of the indirect call code, while running the object program compiled by said compile means, at least, as the information on the procedure, function, or subroutine, based on a predetermined input pattern, and said compile means changes the indirect call code on the corresponding procedure, function, or subroutine into the direct call code when the number of calling times collected by said information collecting means satisfies a predetermined condition, and further inline-expands the direct call code on the procedure, function, or subroutine to an execution code string for directly processing the same procedure, function, or subroutine when the number of calling times of the same procedure, function, or subroutine and the code size thereof satisfy a predetermined condition.

According to the second aspect of the invention, a program compile system for compiling a source program described in a programming language to an object program described in a language executable by a processor, comprises compile means for compiling the source program to the object program, and program executing means for adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated by said compile means based on a predetermined input pattern, said compile means including first optimization means for compiling the source program to an object program and performing optimization by inserting into each position of the indirect call code, a branch condition code for judging whether the value assigned to a variable for use in the indirect call code is the identification information of the procedure, function, or subroutine, whose some summation result on the number of the identification information satisfies a predetermined condition, of a plurality of procedures, functions, or subroutines, and a direct call code for directly calling the same procedure, function, or subroutine when the condition is satisfied, inline expansion means for inline-expanding the direct call code of the procedure, function, or subroutine, whose summation result of the number of the identification information and the code size satisfy a predetermined condition, of the plurality of procedures, functions, or subroutines of the object program obtained through the processing by said first optimization means, to an execution code string for directly processing the same procedure, function, or subroutine, and second optimization means for generating a final object program, as for the procedure, function, or subroutine in the object program obtained through the processing by said inline expansion means, after performing various optimization, including optimization by use of only the information on the same procedure, function, or subroutine and optimization by use of relationship between the other procedure, function, or subroutine.

In the preferred construction, said compile means further includes code inserting means for compiling the source program to the object program and inserting into each position of the indirect call code, a code for supplying the identification information of the procedure, function, or subroutine actually called at a position of the indirect call code when running the object program to the outside, said program executing means runs the object program compiled by said code inserting means of said compile means based on the predetermined input pattern, adds up the number of the identification information of the procedure, function, or subroutine actually called and supplied, in every position of the indirect call code, and supplies the summation result according to the code for supplying the identification information inserted by said code inserting means to the outside, and said first optimization means of said compile means performs optimization based on the summation result about the number of the identification information of the procedure, function, or subroutine supplied from said program executing means.

According to the third aspect of the invention, a compile method for compiling a source program described in a programming language to an object program described in a language executable by a processor, comprising the following steps of compiling the source program to the object program, running the object program generated in said compiling step based on a predetermined input pattern and collecting information on a procedure, function, or subroutine, optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected in said information collecting step.

In the preferred construction, a compile method further comprising the steps of in said information collecting step, collecting, in every indirect call code, the number of times the procedure, function, or subroutine is actually called at a position of the indirect call code, while running the object program compiled in said compile step, at least, as the information on the procedure, function, or subroutine, based on the input pattern, and in said optimization step, changing the indirect call code on the corresponding procedure, function, or subroutine into the direct call code when the number of calling times collected in said information collecting step satisfies a predetermined condition.

In another preferred construction, a compile method further comprising the steps of in said information collecting step, collecting, in every indirect call code, the number of times the procedure, function, or subroutine is actually called at a position of the indirect call code, while running the object program compiled in said compile step, at least, as the information on the procedure, function, or subroutine, based on the input pattern, in said optimization step, changing the indirect call code on the corresponding procedure, function, or subroutine into the direct call code when the number of calling times collected in said information collecting step satisfies a predetermined condition, and after said optimization step, inline-expanding the direct call code on the procedure, function, or subroutine to an execution code string for directly processing the same procedure, function, or subroutine when the number of calling times of the same procedure, function, or subroutine and the code size thereof satisfy a predetermined condition.

According to the fourth aspect of the invention, a program compile method for compiling a source program described in a programming language to an object program described in a language executable by a processor, comprising the following steps of compiling the source program to the object program, adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated in said compile step based on a predetermined input pattern, compiling the source program to an object program again and performing optimization by inserting into each position of the indirect call code, a branch condition code for judging whether the value assigned to a variable for use in the indirect call code is the identification information of the procedure, function, or subroutine, whose summation result on the number of the identification information satisfies a predetermined condition, of a plurality of procedures, functions, or subroutines, and a direct call code for directly calling the same procedure, function, or subroutine when the condition is satisfied, inline-expanding the direct call code of the procedure, function, or subroutine, whose summation result of the number of the identification information and the code size thereof satisfy a predetermined condition, of the plurality of procedures, functions, or subroutines of the object program obtained through the processing in said first optimization step, to an execution code string for directly processing the same procedure, function, or subroutine, performing various optimization, including optimization by use of only the information on the procedure, function, or subroutine and optimization by use of relationship between the other procedure, function, or subroutine, on the procedure, function, or subroutine in the object program obtained through the processing in said inline expansion step, and generating a final object program obtained through the processing in said second optimization step.

In the preferred construction, a compile method further comprising the following steps of between said compile step and said identification information adding step, inserting a code for supplying to the outside, the identification information of the procedure, function, or subroutine actually called at a position of the indirect call code when running the object program, into the position of the indirect call code, between said identification information adding step and said first optimization step, supplying the summation result about the number of the identification information of the procedure, function, or subroutine actually called and supplied, which has been obtained through the execution of the object program in said identification information adding step, according to the code for supplying the identification information inserted in said code inserting step to the outside; and in said first optimization step, performing optimization based on the summation result about the number of the identification information of the procedure, function, or subroutine supplied from said identification information summation result supplying step.

According to the fifth aspect of the invention, a computer readable memory storing a computer program for controlling a computer system and compiling a source program described in a programming language to an object program described in a language executable by a processor, the computer program comprising the following steps of compiling the source program to the object program, running the object program generated in said compile step based on a predetermined input pattern and collecting information on a procedure, function, or subroutine, optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected in said information collecting step.

In another preferred construction, a computer readable memory storing a computer program for controlling a computer system and compiling a source program described in a programming language to an object program described in a language executable by a processor, the computer program comprising the following steps of compiling the source program to the object program, adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated in said compile step based on a predetermined input pattern, compiling the source program to an object program again and performing optimization by inserting into each position of the indirect call code, a branch condition code for judging whether the value assigned to a variable for use in the indirect call code is the identification information of the procedure, function, or subroutine, whose summation result on the number of the identification information satisfies a predetermined condition, of a plurality of procedures, functions, or subroutines, and a direct call code for directly calling the same procedure, function, or subroutine when the condition is satisfied, inline-expanding the direct call code of the procedure, function, or subroutine, whose summation result of the number of the identification information and the code size thereof satisfy a predetermined condition, of the plurality of procedures, functions, or subroutines of the object program obtained through the processing in said first optimization step, to an execution code string for directly processing the same procedure, function, or subroutine, performing various optimization, including optimization by use of only the information on the procedure, function, or subroutine and optimization by use of relationship between the other procedure, function, or subroutine, on the procedure, function, or subroutine in the object program obtained through the processing in said inline expansion step, and generating a final object program obtained through the processing in said second optimization step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a view of a temporary object program expressed in the C language, which program is obtained by compiling the source program of FIG. 2;

FIG. 6 is a view showing an example of the address of a procedure supplied by executing the temporary object program of FIG. 5;

FIG. 7 is a view of an object program expressed in the C language, which program is obtained by compiling the source program of FIG. 2 and changing the frequently called procedure "g" to a direct call procedure;

FIG. 8 is a view showing an example of the content of the procedure "g";

FIG. 9 is a view showing the case where the procedure "g" of the object program of FIG. 7 is inline-expanded;

FIG. 10 is a view showing the state of the first stage in the case where the final optimization processing has been performed on the object program of FIG. 9;

FIG. 11 is a view showing the final object program obtained by performing the final optimization processing on the object program of FIG. 9;

FIG. 12 is a view showing the state of the first stage in the case where the final optimization processing has been performed on the object program of FIG. 7;

FIG. 13 is a view showing the state of the second stage in the case where the final optimization processing has been performed on the object program of FIG. 7;

FIG. 14 is a view showing the final object program obtained by performing the final optimization processing on the object program of FIG. 7;

Figure 16:
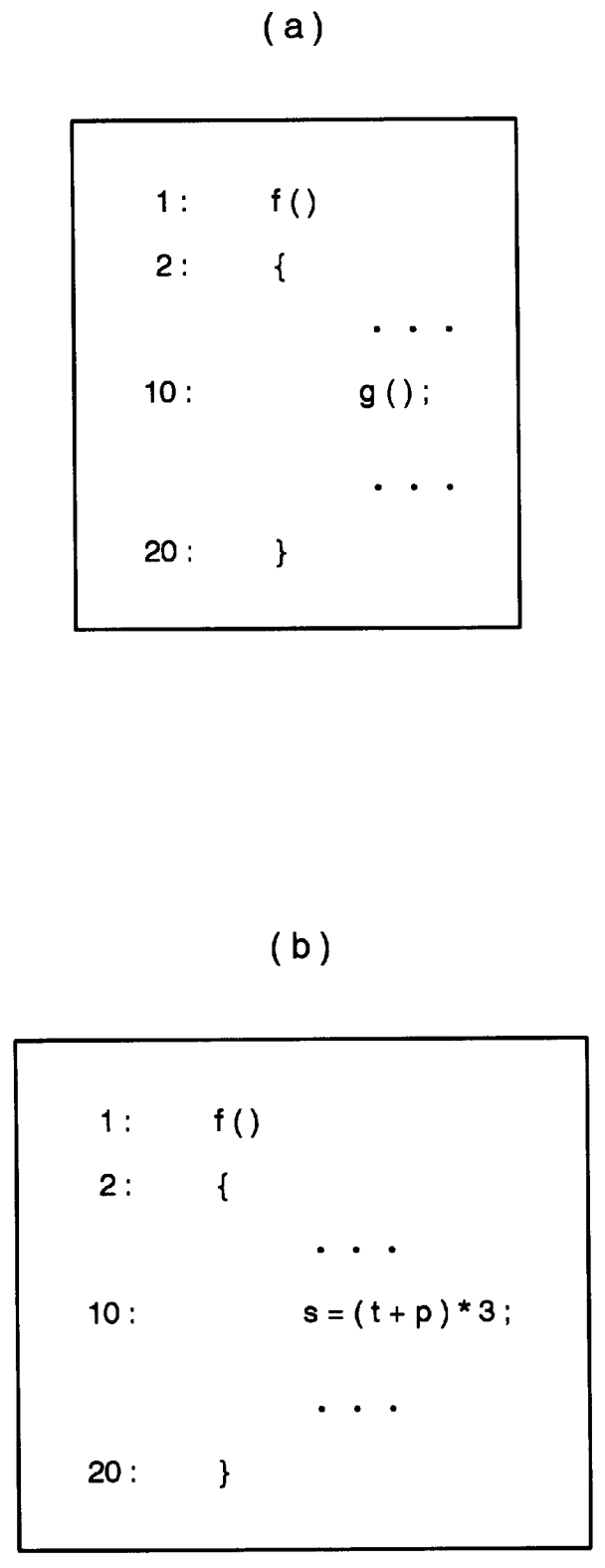

FIGS. 16(a) and 16(b) are views of a source program to be compiled and an optimized object program which are expressed in the C language;

FIG. 17 is a view showing an example of a source program including an indirect call code for a procedure.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
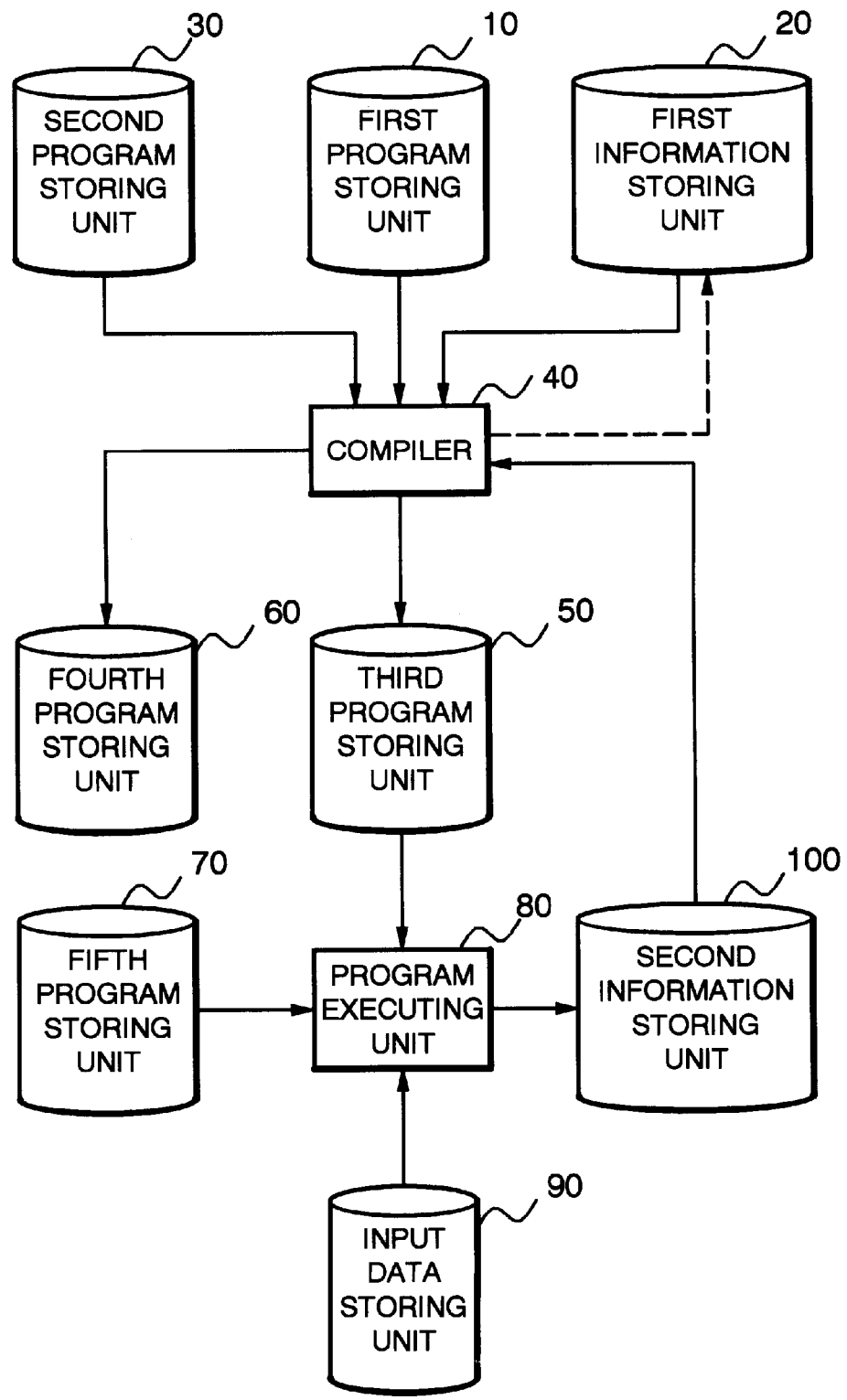
FIG. 1 is a block diagram showing the structure of a program compile system according to an embodiment of the present invention.

FIG. 1 is a block diagram showing the structure of a program compile system according to an embodiment of the present invention. With reference to FIG. 1, the program compile system of the embodiment comprises a first program storing unit 10, a first information storing unit 20, a second program storing unit 30, a compiler 40, a third program storing unit 50, a fourth program storing unit 60, a fifth program storing unit 70, a program executing unit 80, an input data storing unit 90, and a second information storing unit 100.

The program compile system of the embodiment may be realized by a work station, a personal computer, or the other computer system. FIG. 1 shows only the characteristic components of the embodiment, and the description of the other general components is omitted.

Figures 2, 3:
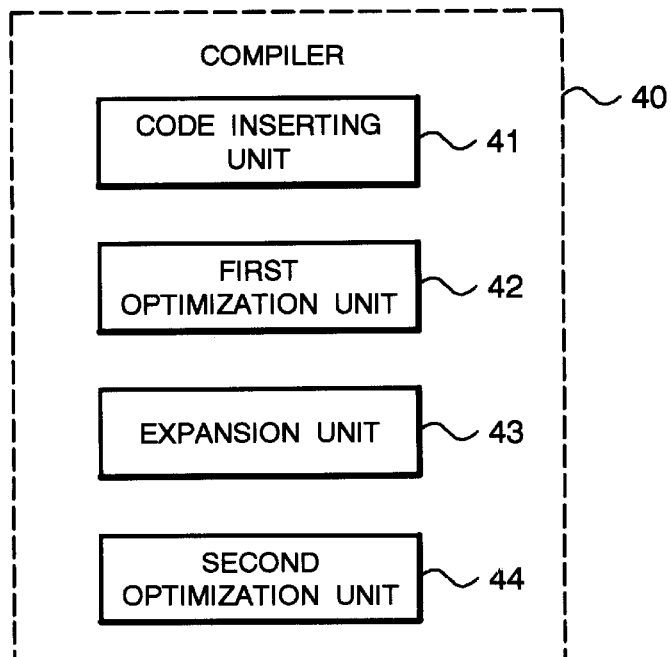
FIG. 2 is a view showing an example of a source program to be compiled by the embodiment.
FIG. 3 is a block diagram showing the structure of a compiler in the embodiment.

The first program storing unit 10 may be realized by semiconductor memory such as ROM or RAM, a magnetic disk such as a floppy disk or a hard disk, an optical disk such as CD-ROM, or the other storing medium, in which a source program described in a programming language is stored in advance. FIG. 2 shows an example of the source program described in the C language. In FIG. 2, each variable "fp", "p", "q", "s", and "t" is a global variable for use in the whole source program, that is, in the outside of the procedure "f". In the source program as shown in FIG. 2, although an indirect procedure call is performed by use of the variable "fp" at the sixth line, assignment of the address of a procedure toward the variable "fp" is to be performed at some line previous to execution of the procedure "f". The procedure is generically called here in the embodiment, including a procedure of original meaning, a function, and a subroutine.

The first information storing unit 20 may be realized by semiconductor memory such as ROM or RAM, a magnetic disk such as a floppy disk or a hard disk, an optical disk such as CD-ROM, or the other storing medium, in which the code size of each procedure for use in the source program is stored in advance. That is, with respect to a built-in function which has been prepared in a processing system such as a compiler and which can be used without being defined by a programmer, in the programming language used for describing a source program, the code size thereof has been previously stored in the first information storing unit 20.

On the contrary, with respect to the procedure defined by a programmer when generating a source program, the code size of each procedure in a temporary object program obtained through the compiler 40 compiling the source program may be required and stored in the first information storing unit 20. In this case, since a code is inserted into the temporary object program by the code inserting unit 41 described later, the code size of each procedure differs strictly by the inserted code; however, such influence is small. When the compiler 40 once compiles the source program to an intermediate language and inline expansion and various optimization processing are performed on a procedure in a program described in the intermediate language, the code size of the procedure in the program may be required and stored in the first information storing unit 20.

The second program storing unit 30 may be realized by semiconductor memory such as ROM or RAM, a magnetic disk such as a floppy disk or a hard disk, an optical disk such as CD-ROM, or the other storing medium, in which a compile program for compiling a source program to a final object program executable by a processor is stored in advance. The compile program is used in compiling by the compiler 40.

The compiler 40 may be realized by a CPU controlled by a compile program stored in the second program storing unit 30, which comprises a code inserting unit 41, a first optimization unit 42, an expansion unit 43, and a second optimization unit 44, as illustrated in FIG. 3. Each component will perform the following processing according to the compile program read from the second program storing unit 30.

The code inserting unit 41 compiles a source program to a temporary object program executable by a processor and stores the object program in the third program storing unit 50. At this time, the code inserting unit 41 inserts a code for supplying to an outside file the identification information of a procedure actually called at a position (for example, the address of the procedure, or the like) when the program executing unit 80 runs the temporary object program, into the corresponding position of an indirect procedure call code.

The first optimization unit 42 compiles the source program to an object program executable by a processor again, and performs optimization by changing an indirect call to a direct call at compiling time. Namely, it reads the number of procedure calling times, that is the number of the times each procedure is called at execution of the object program, at every position of an indirect procedure call code. When a specified procedure call satisfies a predetermined condition, at each position of an indirect procedure call code, the unit 42 judges that this procedure is frequently called, and inserts a branch condition code for judging whether the address assigned to the variable used in this indirect call code is the address of this procedure and a code for directly calling this procedure. Thus, this procedure is changed from an indirect call procedure to a direct call procedure. The condition for judging how often a specified procedure is called is determined by the ratio of the number of times the specified procedure is called (procedure calling frequency) to the number of times all the procedures on the indirect call code are called. The value of the procedure calling frequency may be set at a predetermined value (for example, 80% or 90%) in advance, or the value may be arranged to be set by an operator in the compiler 40.

The expansion unit 43 performs inline expansion processing of a procedure. Namely, the unit 43 first reads the code size of each procedure stored in the first information storing unit 20 and the number of procedure calling times for every procedure stored in the second information storing unit 100. When judging a procedure satisfies the predetermined condition, in every position with respect to the object program compiled by the first optimization unit 42, it judges that the inline expansion of the procedure is advantageous and performs the inline expansion on the procedure. The condition for judging whether the inline expansion is advantageous to a procedure is determined depending on the storage capacity of a storing medium (for example, ROM) storing a final object program, the code size of the corresponding procedure, and the procedure calling frequency. For example, the condition may be set in advance based on the examination result about various programs, or it may be arranged to be set by an operator in the compiler 40.

The second optimization unit 44 performs various optimization such as optimization within a procedure and optimization among procedures on the object program processed by the expansion unit 43, generates a final object program, and stores the object program into the fourth program storing unit 60. The optimization within a procedure means optimization processing by use of only the information on a given procedure. The optimization among procedures means such processing; when a procedure calls another procedure, the called procedure is analyzed, the information thereof is called, the called procedure is optimized if possible, and further the calling procedure is optimized by use of the information on the calling procedure and the information on the called procedure.

The third program storing unit 50 may be realized by semiconductor memory such as ROM or RAM, a magnetic disk such as a floppy disk or a hard disk, or the other writable and readable storing medium, in which the temporary object program generated in the compiler 40 is stored.

The fourth program storing unit 60 may be realized by semiconductor memory such as ROM or RAM, a magnetic disk such as a floppy disk or a hard disk, or the other writable and readable storing medium, in which the final object program generated in the compiler 40 is stored.

The fifth program storing unit 70 may be realized by semiconductor memory such as ROM or RAM, a magnetic disk such as a floppy disk or a hard disk, an optical disk such as CD-ROM, or the other storing medium, in which a dynamic information collecting program for collecting dynamic information (profile information) including the identification information and the number of procedure calling times for every procedure, while the program executing unit 80 is running the temporary object program, is stored in advance. The dynamic information collecting program is generated on the assumption of the input pattern of the most typical input data at execution time of the temporary object program.

The program executing unit 80 may be realized by a hardware emulator, a software simulator, or the like. According to the dynamic information collecting program read from the fifth program storing unit 70, the unit 80 reads the temporary object program from the third program storing unit 50, reads the input data supplied by an operator through the input data storing unit 90, collects the dynamic information while running the temporary object program, and stores the obtained dynamic information into the second information storing unit 100.

The input data storing unit 90 may be realized by semiconductor memory such as a RAM, a magnetic disk such as a floppy disk or a hard disk, or the other writable and readable storing medium, so as to store the input data forming the most typical input pattern to be supplied in running the temporary object program, that has been entered by an operator.

The second information storing unit 100 may be realized by semiconductor memory such as a RAM, a magnetic disk such as a floppy disk or a hard disk, or the other writable and readable storing medium, in which the dynamic information obtained when the program executing unit 80 has run the temporary object program is stored.

This time, the operation of the program compile system having the above structure will be described with reference to FIGS. 4 to 14. At first, the compiler 40 reads the compile program from the second program storing unit 30. Then, according to the read compile program, the code inserting unit 41, the first optimization unit 42, the expansion unit 43, and the second optimization unit 44 will perform the following processing.

Figure 4:
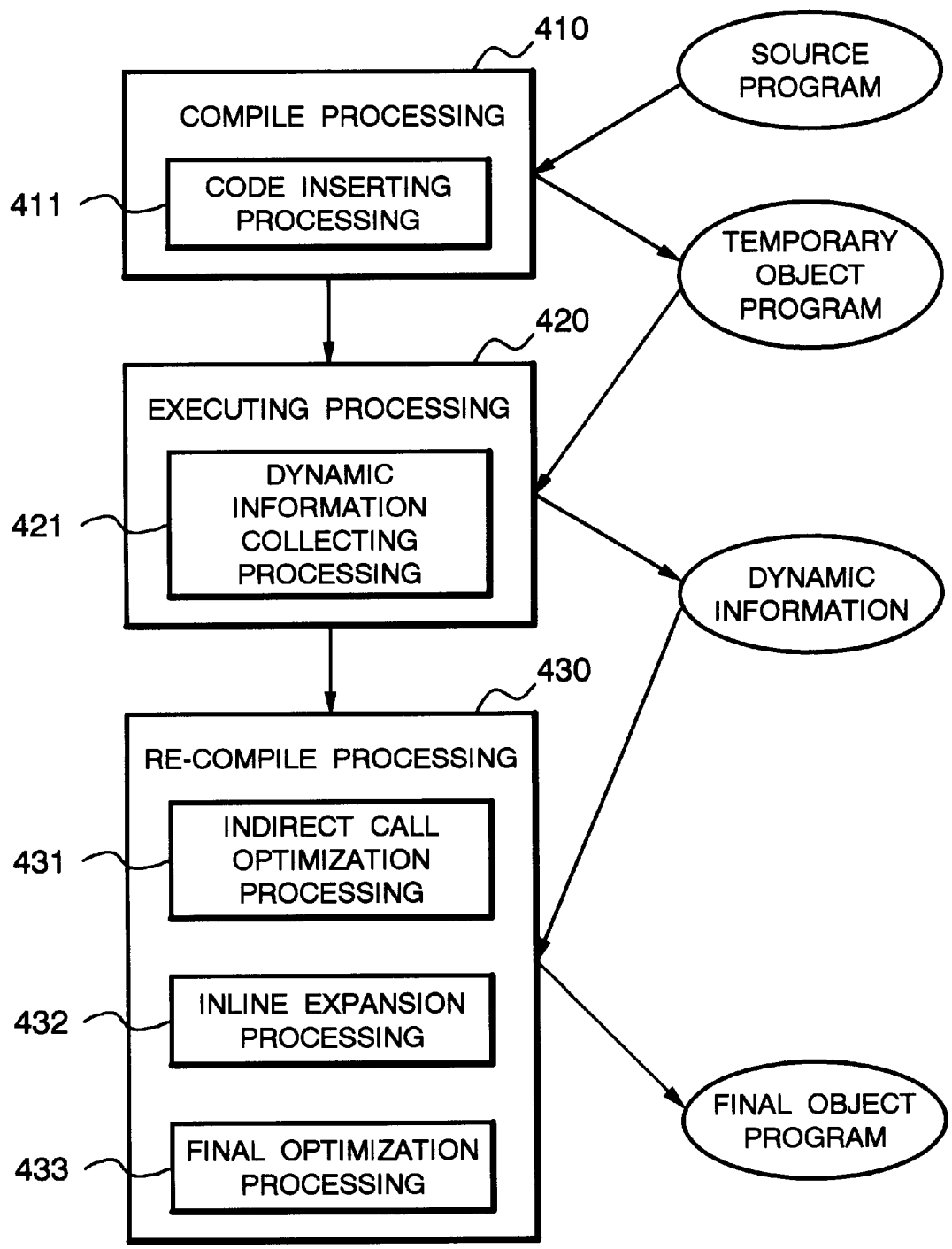
FIG. 4 is a view showing the flow of the embodiment.
Figure 15:
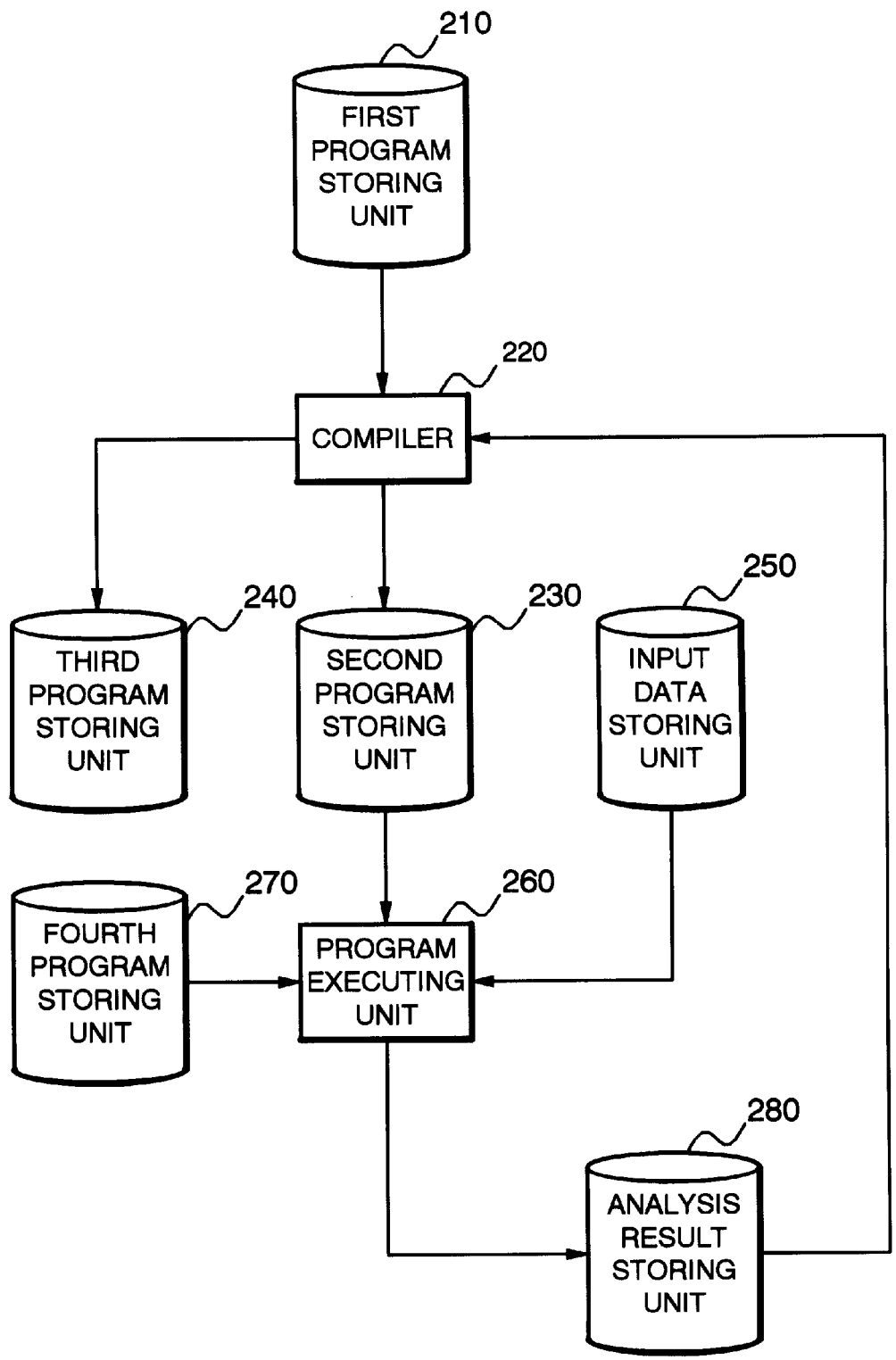
FIG. 15 is a block diagram showing the structural example of the conventional program compile system.

The code inserting unit 41 compiles the source program (refer to FIG. 2) read from the first program storing unit 10 to a temporary object program executable by a processor and stores the object program into the third program storing unit 50 (compile processing 410 in FIG. 4). As illustrated in FIG. 5, the unit 41 inserts a code for supplying the address of a procedure actually called at a position when the program executing unit 80 has run the temporary object program to an outside file, in the case of this embodiment, a code for storing the same into a storing medium such as RAM (not illustrated) forming the program executing unit 80, into every position of an indirect call procedure code (code inserting processing 411 in FIG. 4). FIG. 5 is a view of a temporary object program expressed in the C language, which the source program shown in FIG. 2 has been compiled to and the code inserting processing has been performed on. With reference to FIG. 5, the "printf" statement for supplying the address of a called procedure is inserted at the fifth line.

In generating a temporary object program, the code inserting unit 41 requires the code size of each procedure, in the temporary object program with respect to the respective procedures, defined by a programmer at generation time of the source program, depending on the necessity, and stores the same into the first information storing unit 20.

The program executing unit 80 reads the dynamic information collecting program from the fifth program storing unit 70 and runs the same program. Namely, the program executing unit 80 reads the temporary object program from the third program storing unit 50, reads the input data from the input data storing unit 90, and runs the temporary object program according to the input pattern of the most typical input data (running processing 420 in FIG. 4). Thus, in the process of running the temporary object program, the address of a procedure actually called at each position of an indirect call procedure code is sequentially supplied, as illustrated in FIG. 6, and stored in the storing medium such as RAM (not illustrated) forming the program executing unit 80.

The program executing unit 80, after completion of running the temporary object program, adds up each number of the procedure calling times on each procedure actually called, at every position of indirect call codes and stores the resultant summation together with the address of each procedure into the second information storing unit 100, as the dynamic information (dynamic information collecting processing 421 in FIG. 4). In the example of FIG. 6, the number of the procedure calling times on the procedure of the address "1048784" is the greatest. Therefore, as a result of the dynamic information collecting processing, the number of the procedure calling times on the procedure "g" of the address "1048784" is supposed to be the greatest, at the sixth line of the temporary object program shown in FIG. 5.

The first optimization unit 42 of the compiler 40 compiles the source program to an object program executable by a processor again (re-compile processing 430 in FIG. 4). At this time, the unit 42 reads the number of the procedure calling times on each procedure at every position of an indirect call code stored in the second information storing unit 100 and judges whether a given procedure call satisfies the predetermined condition at each position of an indirect procedure call code. When it satisfies the condition, it judges that the procedure is frequently called and inserts the branch condition code for judging whether the address assigned to the variable used in the indirect call code is the address of the procedure and the code for directly calling the procedure (indirect call optimization processing 431 in FIG. 4). In these ways, the procedure is changed from an indirect call procedure to a direct call one. For example, assume that the number of the procedure calling times of the procedure "g" is the greatest at the sixth line of the temporary object program shown in FIG. 5 and the procedure "g" call satisfies the predetermined condition. In this case, since it is judged that the procedure "g" is frequently called at the position, such an object program as shown in FIG. 7 is generated. With reference to FIG. 7, the branch condition code is at the sixth and the ninth lines, the code for directly calling the procedure "g" is at the seventh line, and with respect to the procedures other than the procedure "g", the indirect call code remains as indicated at the tenth line.

The expansion unit 43, reading the code size of each procedure stored in the first information storing unit 20 and the number of the procedure calling times on each procedure stored in the second information storing unit 100, performs the inline expansion processing on a procedure, depending on the necessity, in the object program compiled by the first optimization unit 42 (inline expansion processing 432 in FIG. 4). For example, as illustrated in FIG. 8, when the procedure "g" is a simple function, small in the code size, and it satisfies the predetermined condition, it is judged that the inline expansion is advantageous for the procedure "g" and the inline expansion is performed thereon as indicated at the seventh line in FIG. 9.

The second optimization unit 44 performs various optimization processing such as the optimization within a procedure and the optimization among the procedures on the object program processed by the expansion unit 43 (final optimization processing 433 in FIG. 4), generates a final object program and stores the same into the fourth program storing unit 60.

At this time, the final optimization processing by the second optimization unit 44 will be separately described in the case of the inline expansion performed on the procedure "g" as shown in FIG. 9 and in the case of no inline expansion performed on the procedure "g", with reference to FIGS. 10 to 14.

(1) When the Inline Expansion is Performed on the Procedure "g",

In the state of FIG. 9, the variable "t" and the variable "p" of the inline-expanded procedure "g" are respectively replaced with the value "0" and the value "10" assigned at the third line and the fourth line. For further optimization, the respective codes at the thirteenth line and the fourteenth line are copied and moved to the block of the "if" statement (at the sixth line to the eighth line) and the block of the "else" statement (at the ninth line to the eleventh line). The object program obtained by the above operation is shown in FIG. 10. The processing of copying the codes and moving them to the block of the "if" statement and the block of the "else" statement is described in detail, for example, in the article "Using Profile Information to Assist Classic Compiler Code Optimizations" (P. Chang, S. Mahlke, W. Hwu, Software Practice and Experience, December 1991, Vol. 21, No. 12).

In the state of FIG. 10, the assignment statement (at the seventh line) of the procedure "g" of the block of the "if" statement (at the sixth line to the tenth line) toward the inline-expanded variable "s" is not necessary because there is the assignment statement to the variable "s" at the eighth line just thereafter. Therefore, the statement at the seventh line is deleted. In the block of the "if" statement (at the sixth line to the tenth line), since it is clear that the values of the variable "t" and the variable "p" at the eighth line and the ninth line will not be changed, they are respectively replaced with the value "0" and the value "10" which have been assigned to the variable "t" and the variable "p" at the third line and at the fourth line.

On the contrary, in the block of the "else" statement (at the eleventh line to the fifteenth line), which procedure except for the procedure "g" is actually called, is ambiguous, until execution of the object program, because the indirect procedure call code remains at the twelfth line. Accordingly, the variable "t" and the variable "p" at the thirteenth line and the fourteenth line cannot be replaced with the values "0" and "10" which have been assigned to them at the third line and the fourth line. Therefore, they remain as the variable "t" and the variable "p".

The final object program obtained through the above final optimization processing is shown in FIG. 11. With reference to FIG. 11, in the case of frequently happening at execution of the object program, more specifically, in the case where the value of the variable "fp" is the address of the procedure "g", the direct calling processing for the procedure "g" and the processing itself in the called procedure "g" have been deleted and the values to be assigned to the variables "s" and "pf" thereafter have been decided at the time of compile processing. Therefore, even if considering that the processing of checking the value of the variable "fp" is increased, running speed of an object program becomes considerably higher than the conventional one.

(2) When no Inline Expansion is Performed on the Procedure "g"

When the procedure "g" is not a procedure of small code size as shown in FIG. 8, the inline expansion is not performed. Also in this case, efficiency of the object program can be improved by the following optimization processing among procedures.

The respective codes at the thirteenth line and the fourteenth line are copied and moved to the block of the "if" statement (at the sixth line to the eighth line) and to the block of the "else" statement (at the ninth line to the eleventh line), in the object program with no inline expansion performed thereon as shown in FIG. 7, in order to make the optimization processing among procedures more effective. The object program obtained through the above operation is shown in FIG. 12.

In the state of FIG. 12, the optimization processing among procedures is performed in the case of satisfying the condition that the code size of increasing code as a result of being copied by the optimization processing among procedure is not beyond the predetermined code size. For example, the condition of performing the optimization processing among procedures may be set in advance, based on the examination result about various programs, or it may be arranged to be set in the compiler 40 by an operator.

The optimization processing among procedures will be, hereinafter, described. In the following description, the procedure "g" (called procedure) as illustrated at the seventh line in FIG. 12, is assumed to be of the content as shown in FIG. 8, for convenience's sake. Namely, in the case where the called procedure "g" has such a simple structure as shown in FIG. 8, actually the inline expansion is performed on the called procedure "g" as described above; however, the description will be made on the assumption of no inline expansion performed thereon.

At first, the called procedure "g" shown in FIG. 8 is analyzed, and the information (side effects information), such that the variable to be assigned is the variable "s" and the variable to be read is the variable "t" and the variable "p", is collected. In this case, if possible, optimization of the called procedure "g" (optimization within a function) is performed. When the content of the called procedure "g" is the content shown in FIG. 8, it is not necessary to perform the optimization within a function.

Optimization of the procedure "f" that is a called procedure will be performed, this time. By use of the side effects information on the called procedure "g" which has been collected previously, each position of calling the procedure "g" is analyzed. Here, in the called procedure "g", the variable to be assigned is the variable "s" and the variable to be read is the variable "t" and the variable "p", and it is clear that the values of the variables "t" and "p" would not be changed. Accordingly, in the block of the "if" statement (at the sixth line to the tenth line) shown in FIG. 12, the variable "t" and the variable "p" at the eighth line and the ninth line are respectively replaced with the values "0" and "10" which have been assigned to the variable "t" and the variable "p" at the third line and the fourth line.

On the contrary, in the block of the "else" statement (at the eleventh line to the fifteenth line), since the indirect procedure call code remains at the twelfth line, which procedure except for the procedure "g" is actually called is ambiguous until the object program runs. Therefore, the variable "t" and the variable "p" at the thirteenth line and the fourteenth line cannot be replaced with the values "0" and "10" which have been assigned to them at the third line and the fourth line. Then, they remain as the variable "t" and the variable "p".

The object program obtained through the above operation is shown in FIG. 13. In the state of FIG. 13, the final object program obtained through the arrangement of the eighth line and the ninth line is shown in FIG. 14. With reference to FIG. 14, in the case of frequently happening at execution time of the object program, that is, in the case where the value of the variable "fp" is the address of the procedure "g", the values to be assigned to the variable "s" and the variable "p" at the eighth line and the ninth line have been decided at compile processing time. There may be a case of requiring longer time for multiplication than the running time of the other operation, depending on the type of a processor to run the object program. Such a processor is arranged so that "s=0" is immediately served at the eighth line in FIG. 14, instead of multiplication operation of "s=t*2"; thereby, running speed on the whole object program is considerably up compared with the conventional one, even if considering increasing processing of checking the value of the variable "fp".

In the above description, although the optimization of an indirect procedure call on the source program has been described, it is needless to say that various optimization processing such as optimization processing within a function, in addition to the optimization processing by inline expansion, is performed on a direct procedure call on the source program, when the condition such as the code size is satisfied.

Although the present invention has been described in detail, taking as a preferred embodiment, the concrete structure of the present invention is not restricted to the above-mentioned embodiment, but various modifications in the design, without departing from the spirit thereof, may be included in the present invention.

For example, although the respective program storing units 10, 30, 50, 60, 70, the respective information storing units 20, 100, and the input data storing unit 90 are separately constituted as individual storing medium, in the above-mentioned embodiment, as illustrated in FIG. 1, they are not restricted to this way, but they may be constituted physically in a single storing medium having various storing areas. In this case, since the respective program storing units 10, 30, 50, 60, 70 are to store a program requiring large storing capacity, they may be constituted by an external storing device such as a floppy disk, hard disk, or CD-ROM; since the respective information storing units 20, 100 and the input data storing unit 90 are to store data requiring comparatively smaller storing capacity, they may be constituted by semiconductor memory such as ROM or RAM.

In the above-mentioned embodiment, the code inserting unit 41 is provided in the compiler 40, so to insert a code for supplying the identification information of a procedure actually called at a position to an outside file when the program executing unit 80 runs the temporary object program, into the position of indirect call procedure code. Alternatively, for example, a means for collecting information of running a program may be provided in the program executing unit 80, so to collect the procedure identification information in running the temporary object program, instead of providing the compiler 40 with the code inserting unit 41. By way of example, in the case of a software simulator which simulates the operation of a processor by software, the software simulator may be provided with a function such that, at execution time of an object program, an operator can specify the address of a position of an indirect call procedure code in the object program, so to supply the value of a variable for indirectly calling a procedure at a position (in the object program used in the above-mentioned embodiment, the variable "fp") to the outside; thereby, the function makes it possible to supply the address of a procedure to an outside file.

Further, in the above-mentioned embodiment, each component shown in FIG. 1 is constituted by hardware, by way of example. Alternatively, the above program compile system may be constituted by a computer system including a CPU (Central Processing Unit), internal memory such as ROM or RAM, external storing device such as FDD (Floppy Disk Drive), HDD (Hard Disk Drive), or CD-ROM drive, and predetermined output means, and input means. In the respective components shown in FIG. 1, the compiler 40 and the program executing unit 80 may be formed by CPU; the respective program storing units 10, 30, 50, 60, 70, the respective information storing units 20, 100, and the input data storing unit 90 may be formed by the internal memory or external storing device; and the compile program and the dynamic information collecting program may be combined with each other as a program converting program, which is stored in semiconductor memory such as ROM, floppy disk, hard disk, or a storing medium such as CD-ROM.

In this case, the program converting program is read from the storing medium into the CPU, so to control the operation of the CPU. The CPU works as the compiler 40 and the program executing unit 80 upon activation of the program converting program, and according to the control of the program converting program, the above-mentioned compile processing and the optimization processing will be executed.

As set forth hereinabove, the program compile system and its compile method of the present invention is effective in that a source program including an indirect procedure call can be properly optimized and compiled to an efficient object program.

Therefore, running speed at execution of the object program can be increased. Especially, a source program by an object oriented language, having a tendency to increase use of indirect procedure calls for convenience in processing, can show its remarkable effect.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program compile system for compiling a source program described in a programming language to an object program described in a language executable by a processor, comprising:

compile means for compiling the source program to the object program; and information collecting means for running the object program generated by said compile means based on a predetermined input pattern and collecting information on a procedure, a function, or a subroutine;

said compile means optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected by said information collecting means.

2. A program compile system as set forth in claim 1, wherein said information collecting means in every indirect call code, collects the number of times the procedure, function, or subroutine is actually called at a position of the indirect call code, while running the object program compiled by said compile means, at least, as the information on the procedure, function, or subroutine, based on a predetermined input pattern, and said compile means changes the indirect call code on the corresponding procedure, function, or subroutine into the direct call code when the number of calling times collected by said information collecting means satisfies a predetermined condition.

3. A program compile system as set forth in claim 1, wherein said information collecting means in every indirect call code, collects the number of times the procedure, function, or subroutine is actually called at a position of the indirect call code, while running the object program compiled by said compile means, at least, as the information on the procedure, function, or subroutine, based on a predetermined input pattern, and said compile means changes the indirect call code on the corresponding procedure, function, or subroutine into the direct call code when the number of calling times collected by said information collecting means satisfies a predetermined condition, and further inline-expands the direct call code on the procedure, function, or subroutine to an execution code string for directly processing the same procedure, function, or subroutine when the number of calling times of the same procedure, function, or subroutine and the code size thereof satisfy a predetermined condition.

4. A program compile system for compiling a source program described in a programming language to an object program described in a language executable by a processor, comprising:

compile means for compiling the source program to the object program; and program executing means for adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated by said compile means based on a predetermined input pattern;

said compile means including first optimization means for compiling the source program to an object program and performing optimization by inserting into each position of the indirect call code, a branch condition code for judging whether the value assigned to a variable for use in the indirect call code is the identification information of the procedure, function, or subroutine, whose some summation result on the number of the identification information satisfies a predetermined condition, of a plurality of procedures, functions, or subroutines, and a direct call code for directly calling the same procedure, function, or subroutine when the condition is satisfied;

inline expansion means for inline-expanding the direct call code of the procedure, function, or subroutine, whose summation result of the number of the identification information and the code size satisfy a predetermined condition, of the plurality of procedures, functions, or subroutines of the object program obtained through the processing by said first optimization means, to an execution code string for directly processing the same procedure, function, or subroutine; and second optimization means for generating a final object program, as for the procedure, function, or subroutine in the object program obtained through the processing by said inline expansion means, after performing various optimization, including optimization by use of only the information on the same procedure, function, or subroutine and optimization by use of relationship between the other procedure, function, or subroutine.

5. A program compile system as set forth in claim 4, wherein said compile means further includes code inserting means for compiling the source program to the object program and inserting into each position of the indirect call code, a code for supplying the identification information of the procedure, function, or subroutine actually called at a position of the indirect call code when running the object program to the outside, said program executing means runs the object program compiled by said code inserting means of said compile means based on the predetermined input pattern, adds up the number of the identification information of the procedure, function, or subroutine actually called and supplied, in every position of the indirect call code, and supplies the summation result according to the code for supplying the identification information inserted by said code inserting means to the outside; and said first optimization means of said compile means performs optimization based on the summation result about the number of the identification information of the procedure, function, or subroutine supplied from said program executing means.

6. A compile method for compiling a source program described in a programming language to an object program described in a language executable by a processor, comprising the following steps of:

compiling the source program to the object program;

running the object program generated in said compiling step based on a predetermined input pattern and collecting information on a procedure, function, or subroutine;

optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected in said information collecting step.

7. A compile method as set forth in claim 6, further comprising the steps of:

in said information collecting step, collecting, in every indirect call code, the number of times the procedure, function, or subroutine is actually called at a position of the indirect call code, while running the object program compiled in said compile step, at least, as the information on the procedure, function, or subroutine, based on the input pattern; and in said optimization step, changing the indirect call code on the corresponding procedure, function, or subroutine into the direct call code when the number of calling times collected in said information collecting step satisfies a predetermined condition.

8. A compile method as set forth in claim 6, further comprising the steps of:

in said information collecting step, collecting, in every indirect call code, the number of times the procedure, function, or subroutine is actually called at a position of the indirect call code, while running the object program compiled in said compile step, at least, as the information on the procedure, function, or subroutine, based on the input pattern;

in said optimization step, changing the indirect call code on the corresponding procedure, function, or subroutine into the direct call code when the number of calling times collected in said information collecting step satisfies a predetermined condition; and after said optimization step, inline-expanding the direct call code on the procedure, function, or subroutine to an execution code string for directly processing the same procedure, function, or subroutine when the number of calling times of the same procedure, function, or subroutine and the code size thereof satisfy a predetermined condition.

9. A program compile method for compiling a source program described in a programming language to an object program described in a language executable by a processor, comprising the following steps of:

compiling the source program to the object program;

adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated in said compile step based on a predetermined input pattern;

compiling the source program to an object program again and performing optimization by inserting into each position of the indirect call code, a branch condition code for judging whether the value assigned to a variable for use in the indirect call code is the identification information of the procedure, function, or subroutine, whose summation result on the number of the identification information satisfies a predetermined condition, of a plurality of procedures, functions, or subroutines, and a direct call code for directly calling the same procedure, function, or subroutine when the condition is satisfied;

inline-expanding the direct call code of the procedure, function, or subroutine, whose summation result of the number of the identification information and the code size thereof satisfy a predetermined condition, of the plurality of procedures, functions, or subroutines of the object program obtained through the processing in said first optimization step, to an execution code string for directly processing the same procedure, function, or subroutine;

performing various optimization, including optimization by use of only the information on the procedure, function, or subroutine and optimization by use of relationship between the other procedure, function, or subroutine, on the procedure, function, or subroutine in the object program obtained through the processing in said inline expansion step; and generating a final object program obtained through the processing in said second optimization step.

10. A compile method as set forth in claim 9, further comprising the following steps of:

between said compile step and said identification information adding step, inserting a code for supplying to the outside, the identification information of the procedure, function, or subroutine actually called at a position of the indirect call code when running the object program, into the position of the indirect call code;

between said identification information adding step and said first optimization step, supplying the summation result about the number of the identification information of the procedure, function, or subroutine actually called and supplied, which has been obtained through the execution of the object program in said identification information adding step, according to the code for supplying the identification information inserted in said code inserting step to the outside; and in said first optimization step, performing optimization based on the summation result about the number of the identification information of the procedure, function, or subroutine supplied from said identification information summation result supplying step.

11. A computer readable memory storing a computer program for controlling a computer system and compiling a source program described in a programming language to an object program described in a language executable by a processor, the computer program comprising the following steps of:

compiling the source program to the object program;

running the object program generated in said compile step based on a predetermined input pattern and collecting information on a procedure, function, or subroutine;

optimizing the object program by changing such an indirect call code that, with identification information of the procedure, function, or subroutine assigned to a predetermined variable at a predetermined position on a program, the procedure, function, or subroutine is indirectly called at another predetermined position by use of the variable, to such a direct call code that the procedure, function, or subroutine is directly called at a predetermined position on the program based on the information collected in said information collecting step.

12. A computer readable memory as set forth in claim 11, the computer program further comprising the steps of:

in said information collecting step of the computer program, collecting, in every indirect call code, the number of times the procedure, function, or subroutine is actually called at a position of the indirect call code, while running the object program compiled in said compile step, at least, as the information on the procedure, function, or subroutine, based on the input pattern; and in said optimization step, changing the indirect call code on the corresponding procedure, function, or subroutine into the direct call code when the number of calling times collected in said information collecting step satisfies a predetermined condition.

13. A computer readable memory as set forth in claim 11, the computer program further comprising the steps of:

in said information collecting step of the computer program, collecting, in every indirect call code, the number of times the procedure, function, or subroutine is actually called at a position of the indirect call code, while running the object program compiled in said compile step, at least, as the information on the procedure, function, or subroutine, based on the input pattern;

in said optimization step, changing the indirect call code on the corresponding procedure, function, or subroutine into the direct call code when the number of calling times collected in said information collecting step satisfies a predetermined condition; and after said optimization step, inline-expanding the direct call code on the procedure, function, or subroutine to an execution code string for directly processing the same procedure, function, or subroutine when the number of calling times of the same procedure, function, or subroutine and the code size thereof satisfy a predetermined condition.

14. A computer readable memory storing a computer program for controlling a computer system and compiling a source program described in a programming language to an object program described in a language executable by a processor, the computer program comprising the following steps of:

compiling the source program to the object program;

adding up the number of identification information on the procedure, function, or subroutine actually called and supplied, in every position of such an indirect call code that, with the identification information of the procedure, function, or subroutine assigned to a predetermined variable at a predetermined position on a program, the same procedure, function, or subroutine is indirectly called at another predetermined position by use of the variable, while running the object program generated in said compile step based on a predetermined input pattern;

compiling the source program to an object program again and performing optimization by inserting into each position of the indirect call code, a branch condition code for judging whether the value assigned to a variable for use in the indirect call code is the identification information of the procedure, function, or subroutine, whose summation result on the number of the identification information satisfies a predetermined condition, of a plurality of procedures, functions, or subroutines, and a direct call code for directly calling the same procedure, function, or subroutine when the condition is satisfied;

inline-expanding the direct call code of the procedure, function, or subroutine, whose summation result of the number of the identification information and the code size thereof satisfy a predetermined condition, of the plurality of procedures, functions, or subroutines of the object program obtained through the processing in said first optimization step, to an execution code string for directly processing the same procedure, function, or subroutine;

performing various optimization, including optimization by use of only the information on the procedure, function, or subroutine and optimization by use of relationship between the other procedure, function, or subroutine, on the procedure, function, or subroutine in the object program obtained through the processing in said inline expansion step; and generating a final object program obtained through the processing in said second optimization step.

15. A computer readable memory as set forth in claim 14, the computer program further comprising the following steps of:

between said compile step and said identification information adding step, inserting a code for supplying to the outside, the identification information of the procedure, function, or subroutine actually called at a position of the indirect call code when running the object program, into the position of the indirect call code;

between said identification information adding step and said first optimization step, supplying the summation result about the number of the identification information of the procedure, function, or subroutine actually called and supplied, which has been obtained through the execution of the object program in said identification information adding step, according to the code for supplying the identification information inserted in said code inserting step to the outside; and in said first optimization step, performing optimization based on the summation result about the number of the identification information of the procedure, function, or subroutine supplied from said identification information summation result supplying step.

* * * * *